Patented May 18, 1926.

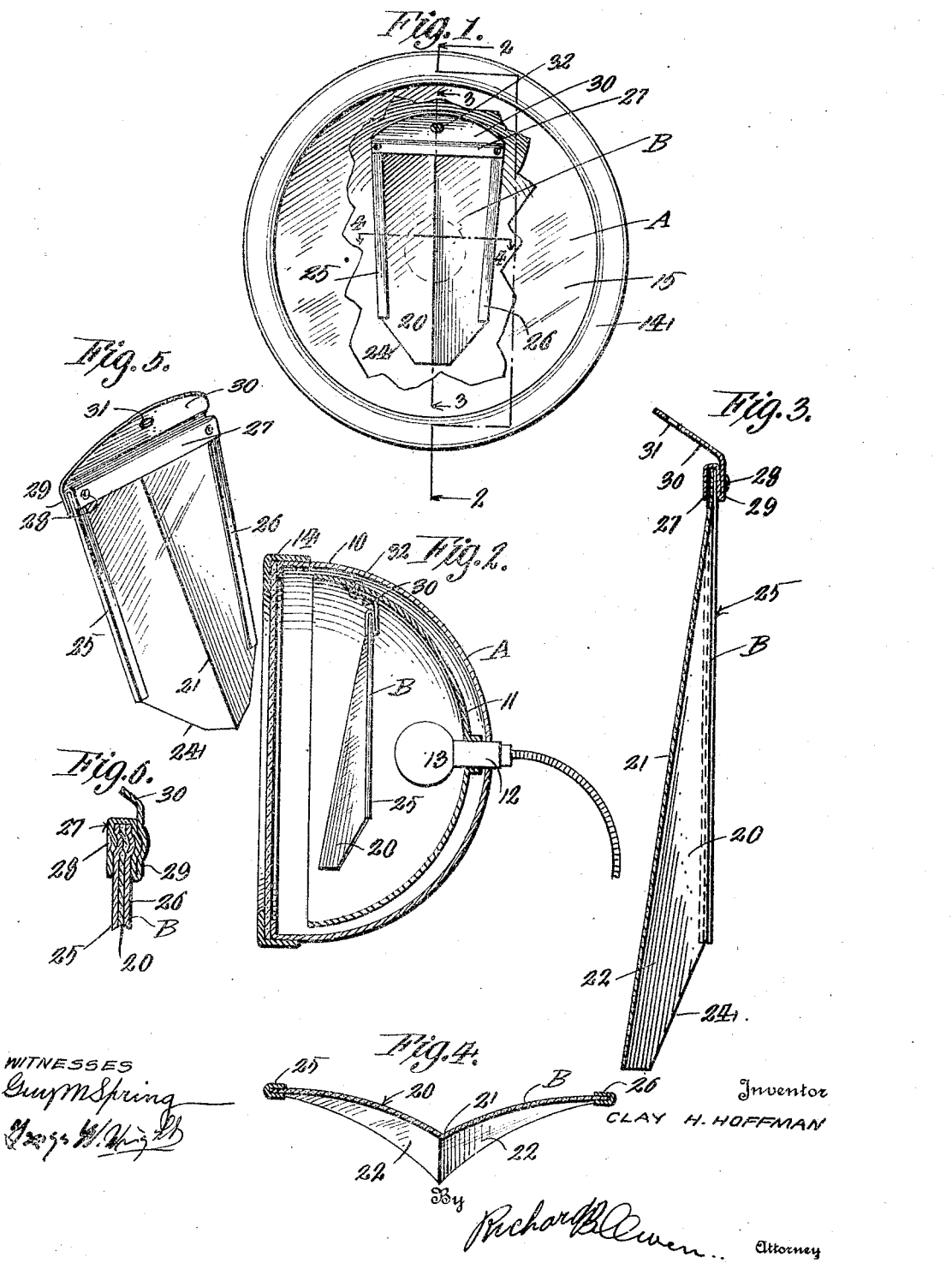
May 18, 1926.
C. H. HOFFMAN
HEADLIGHT GLARESHIELD
Filed Sept. 21, 1925
1,585,194

1,585,194

UNITED STATES PATENT OFFICE.

CLAY H. HOFFMAN, OF PORTSMOUTH, OHIO, ASSIGNOR OF ONE-THIRD EACH TO JOHN E. FRITZ AND WILLIAM E. CRICHTON, OF PORTSMOUTH, OHIO.

HEADLIGHT GLARESHIELD.

Application filed September 21, 1925. Serial No. 57,769.

This invention appertains to attachments for vehicle headlights and the primary object of the invention is to provide a novel device for eliminating glare, which can be readily associated with headlights of the usual construction without the change thereof and by an ordinary layman.

Another salient object of the invention is the provision of an anti-glare attachment for automobile headlights embodying a shield adapted to be positioned between the illuminating means of the headlights and the front glass plates or lens of the headlights, the shield being so constructed as to soften the light and to permit the bright lights to be used at all times without ill effect on the drivers of approaching vehicles, thereby eliminating the necessity of dimming the headlights when passing other vehicles on the road.

A further object of the invention is to provide novel means for constructing the shield, so as to reflect the rays of light emanated from the incandescent lamp back into the reflector thereby causing reflected rays of light of a soft and non-glaring character.

A further object of the invention is to provide novel means for forming the lower end of the shield, so as to permit a fan shaped ray of light of a bright character to be reflected downward on the road directly in advance of the automobile equipped with the shield.

A further object of the invention is the provision of a novel frame for supporting the shield and for permitting the ready connection of the shield with the reflector of the headlight between the incandescent lamp and the front glass plate or lens of the headlight.

A still further object of the invention is to provide an anti-glare headlight shield of the above character which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed, and illustrated in the accompanying drawings, in which drawings:

Figure 1 is a front elevation of a headlight showing the improved anti-glare headlight shield associated therewith, the front glass plate or lens of the headlight being shown broken away.

Figure 2 is a central diametric section taken through the headlight on the line 2—2 of Figure 1 looking in the direction of the arrows, showing the novel shield incorporated therewith, Figure 3 is a central longitudinal section taken directly through the shield on the line 3—3 of Figure 1, illustrating substantially the true size of the shield, Figure 4 is a horizontal section through the shield taken on the line 4—4 of Figure 1 looking in the direction of the arrows, illustrating the transverse cross sectional configuration of the shield for causing the reflecting back of the rays of light into the headlight, Figure 5 is a detail perspective view of the improved shield illustrating the supporting frame therefor, and Figure 6 is an enlarged detail vertical section through the shield illustrating the means of securing the frame to the body of the shield.

Referring to the drawings in detail, wherein similar reference characters designate corresponding parts throughout the several views the letter A generally indicates a headlight for a motor vehicle and B the novel anti-glare shield therefor.

The headlight A is of the conventional type and has been simply shown to illustrate the shield and as shown the headlight A embodies the usual casing 10 having the reflector 11 disposed therein which supports a socket 12 at its axial center for the illuminating means or incandescent lamp 13. The front of the casing 10 supports the usual rim 14 for holding the front glass plate or lens 15 of the headlight in position.

The improved anti-glare shield B comprises a body 20 formed of transparent or translucent material, such as celluloid or the like and this body is preferably of a green color in order to effectively insure the softening of the rays of light emanated from an incandescent lamp 13.

The celluloid body 20 is of a substantially rectangular configuration and is creased at its longitudinal center as at 21 to provide the oppositely inclined side sections 22 which also gradually diverge forwardly from the perpendicular. The lower edge of the body 20 has its opposite sides cut on an incline as at 24 in order to permit the rays of light to be cast downward on the roadway directly in front of the vehicle. The body 20 is supported in a novel frame 25 which can be formed of sheet metal if so desired. This frame 25 includes side pieces 26 which are of a substantially U-shape for receiving the side edges of the body 20 and as shown these side pieces 26 are folded and clamped into tight engagement with said sides of the body. These side bars or pieces 26 extend from one end of the body to the other and terminate flush with the upper edge of said body. A top bar of a U-shape is provided for receiving the upper edge of the body 20 and the upper end of the side bars or strips 26 and the terminals of the top bars 27 and the upper ends of the side pieces 26 as well as the body 20 are provided with struck in tits 28 as clearly shown in Figure 6 of the drawings in order to hold the side pieces 26, the top piece 27 in engagement with the said body 20. The lower edge of the bar 27 at the rear thereof is provided with a bent back strip 29 which has been formed integrally therewith forwardly projecting attaching brackets or flange 30, which extends at an angle to the horizontal. This bracket 30 is provided with an opening 31 for the reception of a suitable fastening element, as will be hereinafter more fully described.

As heretobefore stated the shield B is placed directly within the headlight A between the incandescent lamp 13 and the front glass plate or lens 15 of the headlight and the bracket or attaching flange 30 is placed in engagement with the upper face of the reflector 11, which is pierced by suitable instruments so as to provide an opening, which will aline with the opening 31 in the attaching flange. A suitable fastening element 32 is passed through the opening so as to hold the shield in place.

The shield functions so as to dim the bright lights and the same is reduced in volume and to a soft light, that gives the driver of the vehicle the advantage of bright headlights, which in no way interferes with a driver coming in the opposite direction. The reduced lower end of the shield allows a fan shaped ray of light to be cast down on the roadway so as to enable the driver to have a full view of the center of the road and the sides thereof.

The raised crease in the center of the body reflects the direct rays of light emanated from the bulb back against the reflectors which in turn produces a soft flexible light of greater volume.

Changes in details may be made without departing from the spirit or scope of this invention, but:

What I claim as new is:

1. The combination with an automobile headlight embodying a casing, a reflector, a source of light carried by the reflector and a front glass plate, of an anti-glare attachment for the headlight comprising a plate of translucent colored material having oppositely inclined sides, means securing the plate to the reflector intermediate the source of light and front glass plate, the shield plate terminating below the source of light and having the sides cut inwardly to permit the rays of light to be cast downward directly in front of the headlights and at the sides thereof.

2. As a new article of manufacture, an anti-glare headlight shield comprising a body of translucent colored material creased at its longitudinal center to provide inclined sides, the lower end of the body being cut inwardly toward the longitudinal center of the body, and a bracket associated with the upper end of said body.

3. As a new article of manufacture, an anti-glare headlight shield comprising a body formed of colored translucent material creased longitudinally to provide oppositely inclined sides, a frame for supporting the body including U-shaped side pieces receiving the sides of the body terminating flush with the upper edge of the body, a U-shaped top strip receiving the upper edge of the body and the upper ends of the side pieces, an attaching bracket carried by the upper strip arranged at an angle thereto, and means securing the upper strip to the side strips and to said body.

4. As a new article of manufacture, an antiglare headlight shield comprising a rectangular shaped body formed of translucent colored material creased longitudinally to provide oppositely inclined sides, the lower edges of the body being cut at an incline in opposite directions, a frame for receiving the body including U-shaped side strips for receiving the side edges of the body terminating flush with the upper edge of the body, a U-shaped top strip receiving the upper edge of the body and the upper ends of the side strips and a bracket formed directly on the upper strip and extending at an angle to the upper strip, and struck in tits forced in the terminals of the upper strip, the upper ends of the side strips, and said body.

In testimony whereof I affix my signature.

CLAY H. HOFFMAN.